(12) United States Patent
Schultheis et al.

(10) Patent No.: US 10,768,032 B2
(45) Date of Patent: Sep. 8, 2020

(54) SENSOR FOR A THERMAL FLOW METER, A THERMAL FLOWMETER AND A METHOD FOR PRODUCING A SENSOR OF A THERMAL FLOW METER

(71) Applicant: Endress+Hauser Flowtec AG, Reinach (CH)

(72) Inventors: Hanno Schultheis, Hermrigen (CH); Alexander Grün, Lörrach (DE); Stephan Gaberthüel, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 19 days.

(21) Appl. No.: 16/324,621

(22) PCT Filed: Jul. 20, 2017

(86) PCT No.: PCT/EP2017/068367
§ 371 (c)(1),
(2) Date: Apr. 29, 2019

(87) PCT Pub. No.: WO2018/028966
PCT Pub. Date: Feb. 15, 2018

(65) Prior Publication Data
US 2019/0250021 A1 Aug. 15, 2019

(30) Foreign Application Priority Data
Aug. 11, 2016 (DE) .......................... 10 2016 114 963

(51) Int. Cl.
*G01F 1/68* (2006.01)
*G01F 1/684* (2006.01)
*B23K 1/19* (2006.01)

(52) U.S. Cl.
CPC ................ *G01F 1/684* (2013.01); *B23K 1/19* (2013.01)

(58) Field of Classification Search
CPC ......................................................... G01F 1/68
See application file for complete search history.

(56) References Cited

U.S. PATENT DOCUMENTS 6,971,274 B2 * 12/2005 Olin .................. G01F 1/684
                                                73/204.22
8,529,127 B2 *  9/2013 Pfau .................. G01F 1/684
                                                   374/208

(Continued)

FOREIGN PATENT DOCUMENTS

AL    102013208387 A1   11/2014
CN        202092690 U   12/2011

(Continued)

OTHER PUBLICATIONS

International Search Report for Patent Application No. PCT/EP2017/068367, WIPO, dated Nov. 16, 2017, 13 pp.

(Continued)

*Primary Examiner* — Jewel V Dowtin
(74) *Attorney, Agent, or Firm* — Kelly J. Smith; Endress+Hauser (USA) Holding Inc.

(57) ABSTRACT

The present disclosure relates to a sensor for a thermal flow measuring device, to a thermal flow measuring device, as well as to a method for the manufacture of such a sensor. The sensor includes a sensor thimble, wherein a defined separation of a sensor element from a thimble floor of the sensor thimble is provided by spacers so that a temperature transfer between the sensor and a liquid flowing around the sensor is provided. Thermal contact between the thimble floor and the sensor element is provided by a solder layer.

15 Claims, 4 Drawing Sheets

1.1

(56) References Cited

U.S. PATENT DOCUMENTS

| | | | |
|---|---|---|---|
| 9,596,795 B2* | 3/2017 | Pfau | G01F 1/684 |
| 10,571,343 B2* | 2/2020 | Ohse | G01K 1/08 |
| 2011/0041597 A1 | 2/2011 | Pfau | |
| 2012/0125093 A1 | 5/2012 | Pfau et al. | |

FOREIGN PATENT DOCUMENTS

| | | |
|---|---|---|
| DE | 10016843 A1 | 5/2001 |
| DE | 102007037538 A1 | 2/2009 |
| DE | 102009028850 A1 | 3/2011 |
| DE | 102013208785 A1 | 11/2014 |
| EP | 2455725 A1 | 5/2012 |

OTHER PUBLICATIONS

Search Report for German Patent Application No. 10 2016 114 963.2, German Patent Office, dated Mar. 22, 2017, 5 pp.

Herboth, Thomas, Gesinterte Silber-Verbindunsschichten unter thermomechanischer Beanspruchung, Dissertation zur Erlangung des Doktorgrades der Technischen Fakultät der Albert-Ludwigs-Univeristät Freiburg im Breisgau, Ludwigsburg 2015, May 10, 2000, 122 pp. (English Abstract).

* cited by examiner 1.1

1.2

SENSOR FOR A THERMAL FLOW METER, A THERMAL FLOWMETER AND A METHOD FOR PRODUCING A SENSOR OF A THERMAL FLOW METER

CROSS-REFERENCE TO RELATED APPLICATION

The present application is related to and claims the priority benefit of German Patent Application No. 10 2016 114 963.2, filed on Aug. 11, 2016 and International Patent Application No. PCT/EP2017/068367, filed on Jul. 20, 2017, the entire contents of which are incorporated herein by reference.

TECHNICAL FIELD

The invention relates to a sensor for a thermal, flow measuring device, to a thermal, flow measuring device having a sensor of the invention and to a method for manufacturing a sensor of the invention for a thermal, flow measuring device.

BACKGROUND

Thermal, flow measuring devices have been used for a long time for measuring the mass flow of a liquid through a tube or pipeline. In such case, such devices rely essentially on two measuring principles.

In the case of the first measuring principle, a sensor in the liquid flowing through the pipeline is heated in such a manner that its temperature remains constant. Assuming that media properties, such as temperature, density and composition, remain the same, the mass flow of the liquid can be ascertained via the heating current needed to keep the temperature constant. In the case of variable media temperature, a second sensor is used for temperature measurement of the liquid.

In the case of the second measuring principle, the flowing liquid is heated with a constant heating power and the temperature of the liquid measured downstream. A higher mass flow leads to a lower measurement temperature and vice versa. Also in this case, a sensor for temperature monitoring of the liquid is helpful. For the heated sensors, reproducible manufacturing is important for achieving a high accuracy of measurement. If the solder layer thickness varies from sensor to sensor, then the required heating current also varies. In order that the flow measurement functions correctly, it is absolutely necessary that the temperature equilibration between sensor and liquid happens rapidly and that variations as regards this feature between individual sensors be as small as possible.

A typical sensor, in such case, includes a sensor thimble, in which a sensor element is arranged and thermally coupled with the sensor thimble by a solder layer. In such case, a uniform thickness of the solder layer between sensor thimble and sensor element is desired, in order to achieve a high accuracy of measurement. In the field of soldering, solutions are known, which lead to a small solder layer thickness variation, however, not to a satisfactory degree or in a manner disadvantageous for sensors of a thermal, flow measuring device. Thus, U.S. Pat. No. 4,626,478 discloses a subject matter with bulges, which assure a separation between the subject matter and a substrate. It is, however, very complicated to provide a sensor element with such bulges. The as yet unpublished patent application DE102016111701.3 avoids this problem by stamping a sensor thimble floor in such a manner that the resulting formations establish a defined separation of the sensor element from a face of the sensor thimble floor facing the sensor element. The stamping of the sensor thimble is, however, burdensome and is accompanied by wear of the stamping punch used therefor.

SUMMARY

An object of the invention is, consequently, to provide a sensor for a thermal, flow measuring device, a thermal, flow measuring device and a method for manufacturing a sensor of a thermal, flow measuring device, wherein the separation of the sensor element from the sensor thimble is kept constant, without requiring burdensome working of the sensor element or the sensor thimble.

The object is achieved by a sensor of the invention as defined in independent claim 1, as well as by a thermal, flow measuring device as defined in independent claim 10 and by a method for manufacturing a sensor of the invention as defined in claim 12.

The sensor of the invention for a thermal, flow measuring device includes:

a sensor thimble, wherein the sensor thimble has a first longitudinal axis and a lateral surface as well as an open end and a closed second end with a thimble floor, wherein the first longitudinal axis intersects the first end and the second end, especially perpendicularly, and wherein a thimble floor surface facing toward the first end is essentially flat;

at least one sensor element, wherein the sensor element is arranged in the sensor thimble in the region of the thimble floor; and a solder layer, which is adapted to connect the sensor element thermally with the thimble floor, wherein the sensor element is positioned relative to the floor surface as defined by at least one spacer, and wherein the spacer comprises a cured sinter paste.

In an embodiment of the sensor, the at least one spacer is adapted to assure a constant separation between the floor surface and the sensor element.

In an embodiment of the sensor, the at least one spacer has a contact area having especially a ring, polygonal or cross shape.

In an embodiment of the sensor, the sensor element is positioned relative to the floor surface as defined by at least three spacers, wherein the spacers define a polygon having a number of corners equal to the number of spacers.

In an embodiment of the sensor, the spacers have a spacing height of, at most, 200 µm and especially, at most, 150 µm and preferably, at most, 100 µm.

In an embodiment of the sensor, the spacers have a spacing height of at least 20 µm and especially at least 50 µm and preferably at least 70 µm.

In an embodiment of the sensor, the sensor thimble has in the region of the thimble floor a wall thickness of, at most, 1.2 mm and especially, at most, 1 mm and preferably, at most, 0.8 mm.

In an embodiment of the sensor, the sensor thimble has in the region of the thimble floor a wall thickness of at least 0.1 mm and especially at least 0.2 mm and preferably at least 0.4 mm.

In an embodiment of the sensor, the sinter paste is adapted, during the curing, to shrink, at most, 20%, and especially, at most, 15% and preferably, at most, 13% in volume relative to a volume of the sinter paste in its uncured state. Especially, the shrinking in volume occurs such that all spacers provided on the sensor thimble shrink to the same extent.

The thermal, flow measuring device of the invention for measuring mass flow of a liquid in a measuring tube having at least one sensor of the invention includes:
 a measuring tube with a second longitudinal axis;
 at least one sensor in the measuring tube; and
 an electronic operating circuit, which is equipped to operate the at least one sensor.

In an embodiment of the flow measuring device, such includes at least two sensors,
 wherein the electronic operating circuit is adapted to heat at least a first sensor,
 wherein the electronic operating circuit is adapted to determine the temperature of the liquid by means of at least a second sensor.

The method of the invention for manufacturing a sensor of the invention for a thermal, flow measuring device for measuring mass flow of a liquid in a measuring tube includes, in such case, method steps as follows:
 providing at least one spacer on a sensor element face to be oriented to face a thimble floor, wherein the spacer is a curable sinter paste, and curing the spacer;
 applying a solder layer on the thimble floor;
 melting the solder layer and pressing the sensor element with the spacer against the thimble floor.

In an embodiment of the method, the curing of the spacer includes heating the sensor element with spacer to at least 20° C. and especially at least 50° C. and preferably at least 100° C. above the melting temperature of the solder material.

In an embodiment of the method, the providing of the spacer occurs by means of a template, which is placed on the sensor element face to be oriented to face the thimble floor, wherein the template has at least one opening, in which the sinter paste is introduced, wherein the fill quantity of the sinter paste in the opening is determined by drawing sinter paste with a doctor knife across the opening.

In an embodiment of the method, the template is at least in the region of the opening electropolished, so that in the case of removal of the template from the sensor element face to be oriented to face the thimble floor the sinter paste remains on the face of the sensor element.

There are thus provided by the present invention a sensor of a thermal, flow measuring device, a thermal, flow measuring device and a method for manufacturing a sensor of a thermal, flow measuring device.

BRIEF DESCRIPTION OF THE DRAWINGS

The invention will now be explained based on examples of embodiments presented with the aid of the appended drawing, the figures of which show as follows.

DETAILED DESCRIPTION

Figure 1:
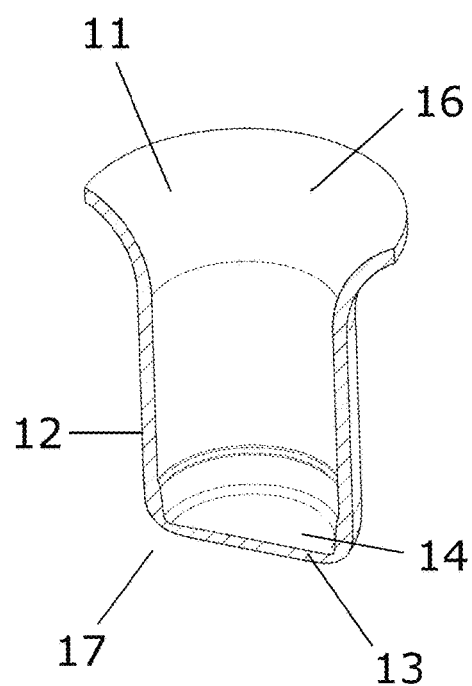
FIG. 1 shows a schematic representation of the sensor using FIGS. 1.1 and 1.2, wherein FIG. 1.1 represents a schematic perspective view onto a longitudinally sectioned sensor thimble of a sensor of the invention and FIG. 1.2 a longitudinal section through a sensor of the invention.
Figure 1:
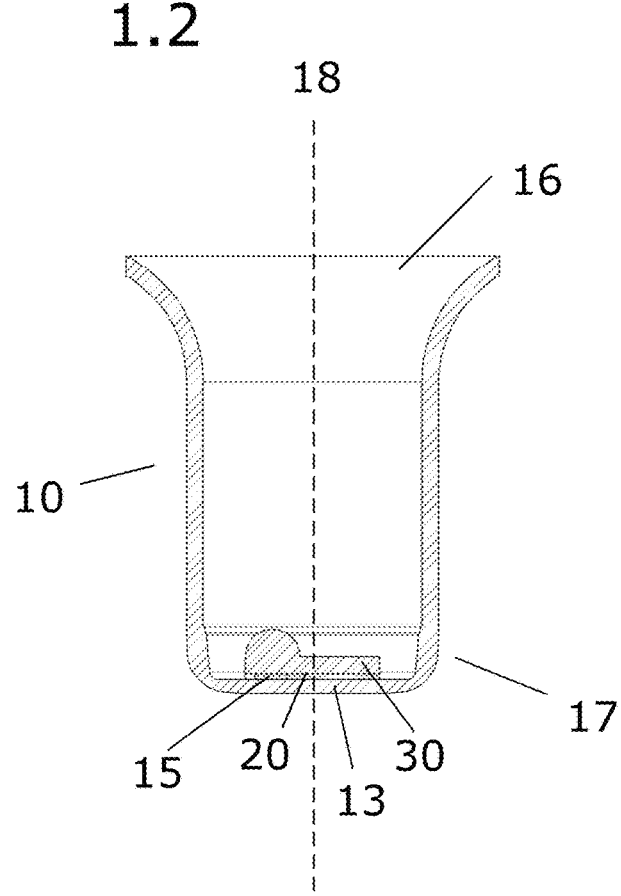

FIGS. 1.1 and 1.2 show a sensor thimble 11 with a lateral surface 12, a thimble floor 13 and a floor surface 14. The sensor thimble is essentially rotationally symmetric relative to a first longitudinal axis 18.

FIG. 1.2 shows a sensor 10, wherein there is arranged in the sensor thimble 11 a sensor element 30, which is connected thermally with the thimble floor 13 via a solder layer 20. The positioning defined by the spacer 15, especially the uniform separation of the sensor element 30 from the thimble floor 13, provides a uniform temperature transfer with small variations between different sensors.

Figure 2:
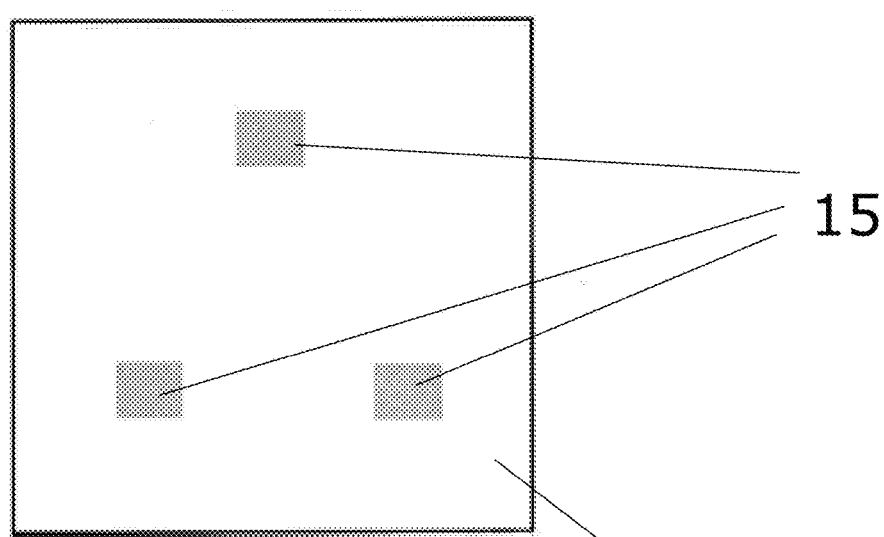
FIG. 2 shows a schematic representation of a sensor element using FIGS. 2.1 and 2.2, wherein FIG. 2.1 represents a plan view of the sensor element with spacers provided thereon, and wherein FIG. 2.2 represents a side view of a sensor element with spacers provided thereon.
Figure 2:
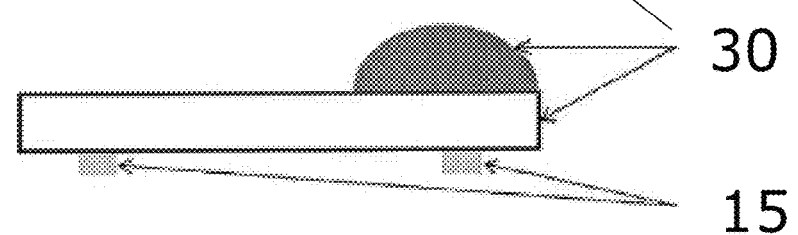

FIG. 2 shows a sensor element 30 with three spacers 15 provided on a sensor element face to be oriented to face the thimble floor 13. Spacers 15 can be provided, for example, with the aid of a template having at least one opening and placed on the face of the sensor element 30 to be oriented to face the thimble floor 13, wherein a curable sinter paste is introduced into the at least one opening. By coating with a doctor knife, it can, in such case, be assured that a curable sinter paste side to be oriented to face the thimble floor 13 terminates evenly with the template. Thus, sufficient accuracy of the spacing height of the spacer 15 is assured.

Figure 3:
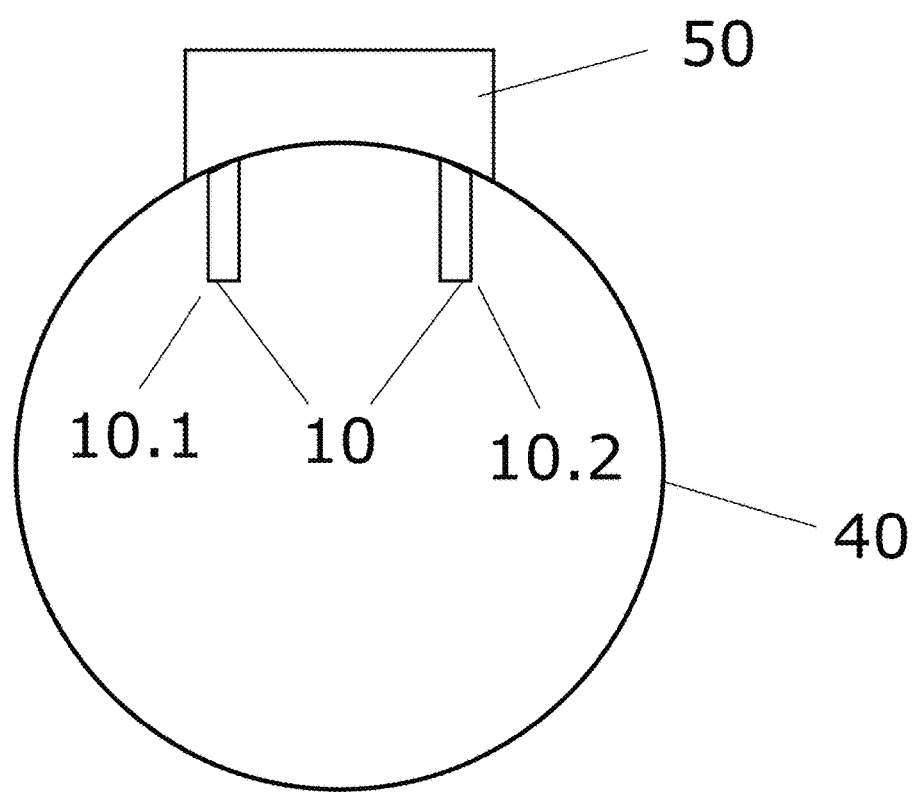
FIG. 3 shows a schematic cross section through a thermal, flow measuring device of the invention.

FIG. 3 shows a schematic cross section through a thermal, flow measuring device of the invention with a measuring tube 40, two sensors 10 of the invention, which are arranged in the lumen of the measuring tube 40, and an electronic operating circuit 50, which is adapted to operate the sensors.

In order to measure the mass flow of a liquid through the measuring tube 40, for example, a first sensor 10.1 in the liquid flowing through the measuring tube 40 is heated in such a manner that a temperature difference relative to the media temperature remains constant. A second sensor 10.2 arranged before or, as shown in FIG. 2, beside the heated sensor 10.1 can be used for temperature measurement of the liquid, in order to maintain the temperature difference. Assuming that media properties such as density and composition remain constant, the mass flow of the liquid can be ascertained via the heating current needed to maintain the temperature.

Figure 4:
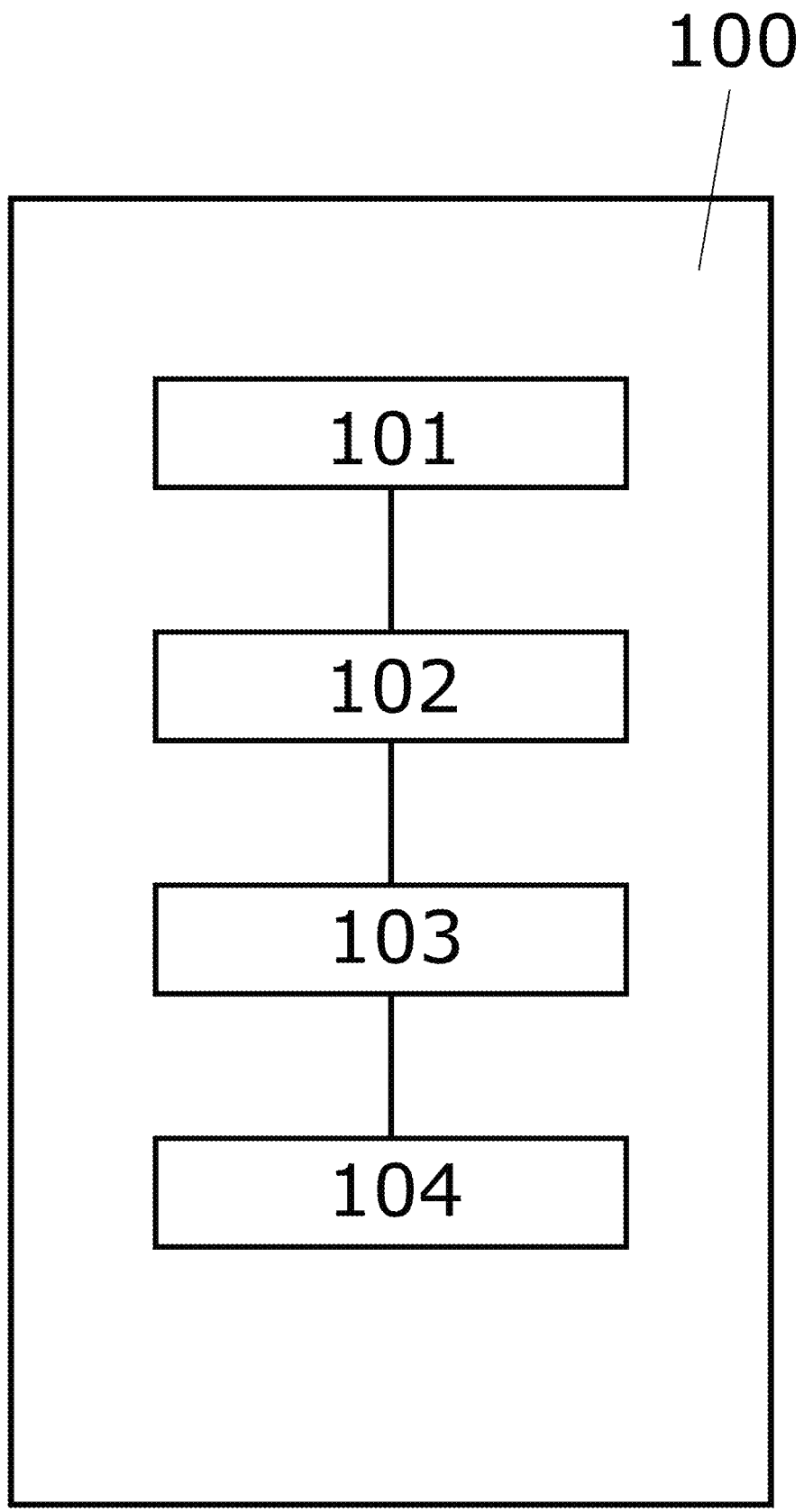
FIG. 4 shows a schematic process flow diagram of the manufacture of a sensor of the invention.

FIG. 4 represents the course of a method 100 of the invention for manufacturing a sensor 10 of the invention.

In a first method step 101, at least one spacer 15 is provided on a face of a sensor element 30 to be oriented to face a thimble floor 13, wherein the spacer 15 is a curable sinter paste.

In a second method step 101, the spacer 15 is cured.

In a third method step 103, the solder layer 20 is applied on the thimble floor 13.

In a fourth method step 104, the solder layer 20 is melted and the at least one sensor element 30 with the at least one spacer 15 is pressed against the thimble floor 13;

In the following cooling of the solder layer 20 to below its melting point, the sensor element 30 maintains a fixed separation from the thimble floor 13 and is thermally connected with such a via the solder layer 20.

LIST OF REFERENCE CHARACTERS 10 sensor
10.1 heated first sensor
10.2 second sensor for temperature measurement
11 sensor thimble 12 lateral surface
13 thimble floor
14 a surface of the thimble floor
15 spacer
16 open first end
17 closed second end
18 first longitudinal axis
20 solder layer
30 sensor element
40 measuring tube
50 electronic operating circuit

The invention claimed is:

1. A sensor for a thermal flow measuring device, comprising:
a sensor thimble, wherein the sensor thimble has a first longitudinal axis, a lateral surface, an open first end, and a closed second end with a thimble floor, wherein the first longitudinal axis perpendicularly intersects the first end and the second end, and wherein a surface of the thimble floor facing toward the first end is flat;
at least one sensor element, wherein the sensor element is positioned in the sensor thimble at the thimble floor; and
a solder layer thermally connecting the sensor element with the thimble floor,
wherein
the sensor element being positioned relative to the surface as defined by at least one spacer, and
wherein the at least one spacer includes a cured sinter paste.

2. The sensor of claim 1,
wherein the at least one spacer is configured to provide a separation between the surface and the sensor element.

3. The sensor of claim 1,
wherein the at least one spacer has a contact area having a ring, polygonal or cross shape.

4. The sensor of claim 1,
wherein the sensor element is positioned relative to the surface as defined by at least three spacers, and wherein the at least three spacers define a polygon having a number of corners equal to the number of spacers.

5. The sensor of claim 4,
wherein the at least three spacers have a spacing height of less than or equal to 200 μm.

6. The sensor of claim 4,
wherein the at least three spacers have a spacing height of greater than or equal to 20 μm.

7. The sensor of claim 1,
wherein the sensor thimble has at the thimble floor a wall thickness of less than or equal to 1.2 mm.

8. The sensor of claim 1,
wherein the sensor thimble has at the thimble floor a wall thickness of greater than or equal to 0.1 mm.

9. The sensor of claim 1,
wherein the sinter paste is configured, during the curing, to shrink less than or equal to 20% in volume relative to a volume of the sinter paste in its uncured state.

10. A thermal flow measuring device for measuring mass flow of a liquid in a measuring tube having at least one sensor,
comprising:
the measuring tube having a second longitudinal axis;
the at least one sensor positioned in the measuring tube; and
an electronic operating circuit equipped to operate the at least one sensor,
wherein the at least one sensor includes:
a sensor thimble, wherein the sensor thimble has a first longitudinal axis, a lateral surface, an open first end, and a closed second end with a thimble floor, wherein the first longitudinal axis perpendicularly intersects the first end and the second end, and wherein a surface of the thimble floor facing toward the first end is flat;
at least one sensor element, wherein the sensor element is positioned in the sensor thimble at the thimble floor; and
a solder layer thermally connecting the sensor element with the thimble floor,
wherein
the sensor element is positioned relative to the surface as defined by at least one spacer, and
wherein the at least one spacer includes a cured sinter paste.

11. The thermal flow measuring device of claim 10,
wherein the thermal flow measuring device includes at least two sensors,
wherein the electronic operating circuit is configured to heat at least a first sensor,
wherein the electronic operating circuit is configured to determine the temperature of the liquid by using at least a second sensor.

12. A method for manufacturing a sensor for a thermal flow measuring device for measuring mass flow of a liquid in a measuring tube,
wherein the method comprises steps as follows:
providing a sensor element with a sensor element face;
providing at least one spacer on the sensor element face to be oriented to face a thimble floor of a sensor thimble, wherein the at least one spacer is a curable sinter paste;
curing the at least one spacer;
applying a solder layer on the thimble floor; and
melting the solder layer and pressing the sensor element with the spacer against the thimble floor.

13. The method of claim 12,
wherein the curing of the at least one spacer includes heating the sensor element with the at least one spacer to greater than or equal to 20° C. above the melting temperature of a solder material used to make the solder layer.

14. The method of claim 12,
wherein providing the at least one spacer occurs by using a template, which is placed on the sensor element face,
wherein the template has at least one opening, in which the curable sinter paste is introduced, wherein a fill quantity of the curable sinter paste in the at least one opening is determined by drawing the curable sinter paste with a doctor knife across the at least one opening.

15. The method of claim 14,
wherein the template is electropolished at the at least one opening, such that the curable sinter paste remains on the sensor element face of the sensor element facing the sensor thimble during removal of the template.

* * * * *